(12) United States Patent
Karayianni

(10) Patent No.: US 8,781,278 B2
(45) Date of Patent: Jul. 15, 2014

(54) LOW SMOKE HALOGEN FREE FLAME RETARDANT THERMOPLASTIC ELASTOMER COMPOSITIONS CONTAINING ZEOLITES

(75) Inventor: Eleni Karayianni, Geneva (CH)

(73) Assignee: E I du Pont de Nemours and Company, Wilmington, DE (US)

( * ) Notice: Subject to any disclaimer, the term of this patent is extended or adjusted under 35 U.S.C. 154(b) by 366 days.

(21) Appl. No.: 13/407,794

(22) Filed: Feb. 29, 2012

(65) Prior Publication Data

US 2012/0224818 A1 Sep. 6, 2012

Related U.S. Application Data

(60) Provisional application No. 61/448,328, filed on Mar. 2, 2011.

(51) Int. Cl.
G02B 6/44 (2006.01)
C08K 5/3492 (2006.01)
H01B 7/295 (2006.01)
C08K 5/00 (2006.01)
C08K 3/34 (2006.01)
C08K 5/5313 (2006.01)

(52) U.S. Cl.
CPC .......... C08K 5/0066 (2013.01); *C08K 3/34* (2013.01); *C08K 5/34928* (2013.01); *C08K 5/5313* (2013.01); H01B 7/295 (2013.01)
USPC .......................................... 385/100; 428/375

(58) Field of Classification Search
None
See application file for complete search history.

(56) References Cited

U.S. PATENT DOCUMENTS

| | | | |
|---|---|---|---|
| 3,900,444 A | 8/1975 | Racky et al. | |
| 4,036,811 A | 7/1977 | Noetzel et al. | |
| 4,180,495 A | 12/1979 | Sandler | |
| 5,780,534 A | 7/1998 | Kleiner et al. | |
| 5,814,690 A | 9/1998 | Penn | |
| 6,013,707 A | 1/2000 | Kleiner et al. | |
| 6,015,510 A | 1/2000 | Jacobson et al. | |
| 6,255,371 B1 | 7/2001 | Schlosser et al. | |
| 6,270,560 B1 | 8/2001 | Kleiner et al. | |
| 6,344,158 B1 * | 2/2002 | Schlosser et al. | 252/609 |
| 6,547,992 B1 | 4/2003 | Schlosser et al. | |
| 7,074,857 B2 | 7/2006 | Bendler et al. | |
| 7,087,666 B2 * | 8/2006 | Hoerold et al. | 524/100 |
| 7,473,726 B2 | 1/2009 | Mitchell et al. | |
| 7,812,063 B2 | 10/2010 | Dietz et al. | |
| 2004/0266916 A1 * | 12/2004 | Harashina et al. | 523/217 |
| 2005/0004277 A1 | 1/2005 | Hoerold et al. | |
| 2005/0004278 A1 | 1/2005 | Knop et al. | |
| 2005/0014874 A1 | 1/2005 | Hoerold et al. | |
| 2005/0032958 A1 | 2/2005 | Bauer et al. | |
| 2005/0084694 A1 | 4/2005 | Bendler et al. | |
| 2005/0101708 A1 | 5/2005 | Knop et al. | |
| 2005/0137300 A1 | 6/2005 | Schlosser et al. | |
| 2005/0266916 A1 * | 12/2005 | Sato et al. | 463/20 |
| 2009/0176091 A1 | 7/2009 | Karayianni et al. | |
| 2009/0253836 A1 | 10/2009 | Flat et al. | |
| 2011/0257313 A1 * | 10/2011 | Seki | 524/126 |
| 2012/0329920 A1 * | 12/2012 | Sato et al. | 524/100 |
| 2013/0018128 A1 * | 1/2013 | Yao et al. | 523/451 |

FOREIGN PATENT DOCUMENTS

| | | |
|---|---|---|
| DE | 2252258 | 5/1974 |
| DE | 2447727 | 4/1976 |
| EP | 0846712 A1 | 10/1998 |
| EP | 1883081 A1 | 1/2008 |
| JP | 2010024272 | 4/2010 |
| WO | 92/20731 A1 | 11/1992 |
| WO | 2004/029155 A3 | 4/2004 |
| WO | 2010/039616 A2 | 4/2010 |

OTHER PUBLICATIONS

International Search Report for PCT/US2012/027455, dated May 3, 2012.
International Search Report for PCT/US2012/027441, dated May 31, 2012.

* cited by examiner

Primary Examiner — Tina Wong

(57) ABSTRACT

Halogen-free flame retardant compositions comprising thermoplastic elastomers, which exhibit flame retardance and low-smoke emission. The flame retardant compositions comprise a) one or more thermoplastic elastomers, and b) from at or about 18 to at or about 50 weight percent, the weight percentage being based on the total weight of the flame retardant composition, of a flame retardant mixture comprising: b1) at least one flame retardant comprising a phosphinate, diphosphinate and/or polymers thereof, b2) a phosphorous-containing amino composition; and b3) a zeolite.

18 Claims, No Drawings

LOW SMOKE HALOGEN FREE FLAME RETARDANT THERMOPLASTIC ELASTOMER COMPOSITIONS CONTAINING ZEOLITES

CROSS-REFERENCE TO RELATED APPLICATION

This application claims the benefit of U.S. Provisional Application No. 61/448,328, filed Mar. 2, 2011.

FIELD OF THE INVENTION

The present invention relates to the field of low smoke halogen free flame retardant compositions comprising thermoplastic elastomers.

BACKGROUND OF THE INVENTION

The design flexibility afforded by many thermoplastic resin compositions, their relative light weight and corrosion resistance make them attractive materials for many uses, including the replacement of metal components in many applications including motor and recreational vehicles, appliances, tools, electronics, furniture, and toys. However, in the construction, furniture, transport or electrical/electronic industries, thermoplastic resin compositions are preferably made flame retardant to promote product safety, prevent the spread of fire and reduce destruction of products exposed to fire. The conventional practice of imparting flame retardance to thermoplastic resin compositions has been the addition of one or more flame retardants or a flame retardant mixture, which typically include a halogenated organic compound such as brominated polystyrene as the flame retardant and an antimony compound as a synergist for the retardant.

However, halogenated flame retardants tend to decompose or degrade at the processing temperatures of thermoplastic resins, which implicates potential health and environmental effects due to the gases that are released. Consequently, there has been a trend away from using halogenated compounds or mixtures containing them to impart flame retardance.

Another conventional approach to impart flame retardance to thermoplastic resin compositions has been the addition of red phosphorus. Int'l. Pat. App. Pub. No. WO 92/20731 discloses a composition comprising an elastomer, a flame retardant comprising red phosphorus and ammonium polyphosphate as a flame retardant synergist. Moreover, the use of fine red phosphorus powder homogeneously dispersed in the resin is known and practiced. In addition to the hazards of fire and explosion related to handling fine red phosphorus powders, the very combustion of red phosphorus causes the emission of toxic fumes due to the formation of phosphine.

To avert the hazards of using halogenated flame retardants and red phosphorus, phosphinate salts, that is, salts of phosphinic acids, also known as phosphinates, have been substituted in thermoplastic resin compositions. DE Pat. Nos. 2,252,258 and 2,447,727 disclose phosphinates used as flame retardants. U.S. Pat. No. 4,180,495 discloses is the use of poly(metal phosphinate) salts in flame retardant polyesters and polyamides. U.S. Pat. No. 6,255,371 discloses flame retardant compositions comprising a) phosphinates, diphosphinates, or polymers of these and b) condensation products of melamine, reaction products of melamine with phosphoric acid, reaction products of condensation products of melamine with phosphoric acid and/or mixtures of these. U.S. Pat. No. 6,270,560 discloses salt mixtures made from aluminum phosphinates, aluminum hydroxide, aluminum phosphonates and/or aluminum phosphates suitable as flame retardants for polymeric molding compositions. U.S. Pat. Nos. 5,780,534 and 6,013,707 disclose flame retardant polyester compositions containing calcium or aluminum salts of phosphinic acid or disphosphinic acid.

A disadvantage of using halogen-free, flame retardant compositions is that, upon exposure to flame, such compositions emit a high level of smoke, which can cause smoke inhalation hazards severe enough to require evacuation of the workplace. Therefore, a need remains for halogen-free, flame retardant compositions comprising thermoplastic elastomers which exhibit the desired flame retardance as well as low smoke emission properties.

SUMMARY OF THE INVENTION

The present invention is directed to flame retardant polymer compositions comprising:
a) one or more thermoplastic elastomers; and
b) from at or about 18 to at or about 50 weight percent, based on the total weight of the flame retardant polymer composition, of a flame retardant mixture comprising:
  b1) at least one flame retardant comprising a material selected from the group consisting of phosphinates of the formula (I); diphosphinates of the formula (II); polymers of (I); polymers of (II); and mixtures of two or more thereof;

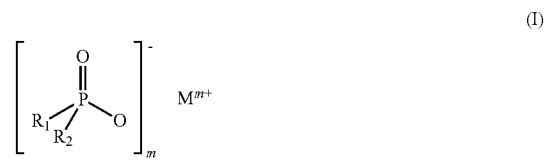

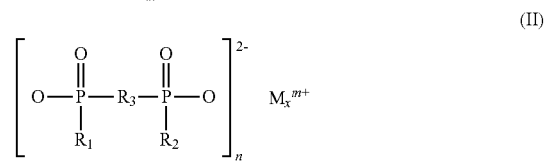

wherein $R_1$ and $R_2$ are independently selected from hydrogen, linear or branched $C_1$-$C_6$ alkyl groups, and aryl groups; $R_3$ is a linear or branched $C_1$-$C_{10}$-alkylene group, a $C_6$-$C_{10}$ arylene group, or an alkylarylene or arylalkylene group; M is selected from the group consisting of calcium, magnesium, aluminum, zinc and mixtures thereof; m is 2 to 3; n is 1 or 3; and x is 1 or 2;
  b2) a phosphorous-containing amino composition selected from the group consisting of melamine phosphates, derivatives of melamine phosphates and mixtures thereof; reaction products of ammonia with phosphoric acid, polyphosphates of said reaction products, and mixtures thereof; and
  b3) a zeolite
  wherein i) b1) is present in the flame retardant polymer composition in an amount greater than or equal to 15 weight percent based on the total weight of the flame retardant polymer composition, and ii) b2) is present in the flame retardant mixture in an amount such that the amount of b2) is less than the amount of b1).

Preferably, the thermoplastic polyester elastomer is a copolyetherester elastomer.

In a preferred embodiment, the phosphorous-containing amino composition b2) is melamine pyrophosphate, melamine polyphosphate, or ammonium polyphosphate, preferably ammonium polyphosphate and in an even more preferred embodiment, the amount of ammonium polyphosphate is greater than 2 weight percent based on the total weight of the flame retardant polymer composition.

In an even more preferred embodiment, the flame retardant polymer composition comprises from at or about 18 to at or about 50 weight percent, preferably from at or about 20 to at or about 40 weight percent of the flame retardant mixture described above wherein b1) is present in the flame retardant mixture in an amount of from at or about to at or about 25 weight percent, b2) is present in the flame retardant mixture in an amount from at or about 5 to at or about 25 weight percent and b3) is present in the flame retardant mixture in an amount from at or about 5 to at or about 20 weight percent, the percentage being based on the total weight of the flame retardant polymer composition.

Also described herein are molded, extruded, or shaped articles comprising the flame retardant composition described above. Further described herein are wires or cables comprising a coating made of the flame retardant compositions described herein.

In addition, the invention is directed to a flame retardant composition comprising A) at least one flame retardant comprising a material selected from the group consisting of phosphinates of the formula (I); diphosphinates of the formula (II); polymers of (I); polymers of (II); and mixtures of two or more thereof;

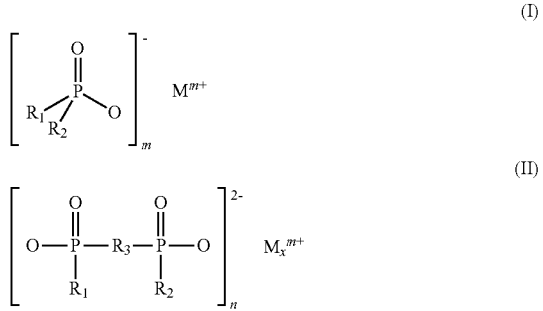

wherein $R_1$ and $R_2$ are independently selected from hydrogen, linear or branched $C_1$-$C_6$ alkyl groups, and aryl groups; $R_3$ is a linear or branched $C_1$-$C_{10}$ alkylene group, a $C_6$-$C_{10}$ arylene group, or an alkylarylene or an arylalkylene group; M is selected from the group consisting of calcium, magnesium, aluminum, zinc and mixtures thereof; m is 2 to 3; n is 1 or 3; and x is 1 or 2, B) a phosphorous-containing amino composition selected from the group consisting of reaction products of ammonia with phosphoric acid, polyphosphates of said reaction products, and mixtures thereof; and C) a zeolite wherein A) is present in the flame retardant composition in an amount from at or about 30 to at or about 85 weight percent, B) is present in the flame retardant composition in an amount greater than 10 to at or about 30 weight percent, and C) is present in the flame retardant composition in an amount from at or about 10 to at or about 40 weight percent, provided that the sum A)+B)+C) is 100 weight percent.

Also described herein are uses of flame retardant compositions described herein for imparting flame retardance and low smoke emission to compositions comprising thermoplastic elastomers.

DETAILED DESCRIPTION OF THE INVENTION

The following definitions are to be used to interpret the meaning of the terms discussed in the description and recited in the claims.

As used herein, the article "a" indicates one as well as more than one and does not necessarily limit its referent noun to the singular.

As used herein, the terms "about" and "at or about" mean that the amount or value in question may be the value designated or some other value that is approximately or about the same. The phrase is intended to convey that similar values promote equivalent results or effects according to the invention.

The one or more thermoplastic elastomers suitable for use in the flame retardant compositions described herein are preferably present in the compositions of the invention in an amount from at or about 50 to at or about 80 weight percent, the weight percentage being based on the total weight of the flame retardant polymer composition, i.e. the sum of the thermoplastic elastomer component, flame retardant mixture component (i.e. the component comprising a flame retardant comprising a material selected from the group of phosphinates of formula (I), diphosphinates of formula (II), polymers thereof, and mixtures thereof, the phosphorous-containing amino composition, and, zeolite component and any optional components). This may also be expressed as the sum of component a)+b1)+b2)+b3) plus any optional components.

Preferably, the one or more thermoplastic elastomers in the flame retardant compositions described herein includes those defined in ISO 18064:2003(E). Thermoplastic elastomers defined in ISO 18064:2003(E) include copolyester thermoplastic elastomers (TPC), thermoplastic polyimide copolymers (TPA), thermoplastic polyolefinic elastomers (TPO), styrenic thermoplastic elastomers (TPS), thermoplastic polyurethanes (TPU), and mixtures of these.

Copolyester thermoplastic elastomers (TPC) include copolyesterester elastomers or copolycarbonateester elastomers, copolyesterester urethane elastomers, and copolyetherester elastomers, the latter being preferred.

Copolyesterester elastomers are block copolymers containing a) hard polyester segments and b) soft and flexible polyester segments. Examples of hard polyester segments are polyalkylene terephthalates, poly(cyclohexanedicarboxylic acid cyclohexanemethanol). Examples of soft polyester segments are aliphatic polyesters, including polybutylene adipate, polytetramethyladipate and polycaprolactone. The copolyesterester elastomers contain blocks of ester units of a high melting polyester and blocks of ester units of a low melting polyester which are linked together through ester groups and/or urethane groups. Copolyesterester elastomers comprising urethane groups may be prepared by reacting the different polyesters in the molten phase, after which the resulting copolyesterester is reacted with a low molecular weight polyisocyanate such as for example diphenylmethylene diisocyanate.

Copolycarbonateester elastomers are block copolymers containing a) hard segments consisting of blocks of an aromatic or semi-aromatic polyester and b) soft segments consisting of blocks of a polycarbonate-containing polymeric component. Suitably, the copolycarbonateester elastomer comprises hard polyester segments made up of repeating units derived from an aromatic dicarboxylic acid and an aliphatic diol, and soft segments comprising repeating units of an aliphatic carbonate, and/or soft segments comprising randomly distributed repeating units of an aliphatic carbonate and either an aliphatic diol and an aliphatic dicarboxylic acid or a lactone, or a combination thereof, wherein the hard segments and the soft segments can be connected with a urethane group. These elastomers and their preparation are described in, e.g. EP Pat. No. 0846712.

Copolyetherester elastomers are the preferred thermoplastic elastomers in the flame retardant compositions of the present invention and have a multiplicity of recurring long-chain ester units and short-chain ester units joined head-to-tail through ester linkages, said long-chain ester units being represented by formula (A):

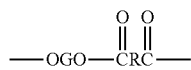

(A)

and said short-chain ester units being represented by formula (B):

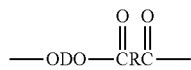

(B)

wherein
G is a divalent radical remaining after the removal of terminal hydroxyl groups from poly(alkylene oxide)glycols having a number average molecular weight of between about 400 and about 6000, or preferably between about 400 and about 3000;
R is a divalent radical remaining after removal of carboxyl groups from a dicarboxylic acid having a molecular weight of less than about 300;
D is a divalent radical remaining after removal of hydroxyl groups from a diol having a molecular weight less than about 250.

As used herein, the term "long-chain ester units" as applied to units in a polymer chain refers to the reaction product of a long-chain glycol with a dicarboxylic acid. Suitable long-chain glycols are poly(alkylene oxide)glycols having terminal (or as nearly terminal as possible) hydroxy groups and having a number average molecular weight of from about 400 to about 6000, and preferably from about 600 to about 3000. Preferred poly(alkylene oxide)glycols include poly(tetramethylene oxide)glycol, poly(trimethylene oxide)glycol, poly(propylene oxide)glycol, poly(ethylene oxide)glycol, copolymer glycols of these alkylene oxides, and block copolymers such as ethylene oxide-capped polypropylene oxide)glycol. Mixtures of two or more of these glycols can be used.

As used herein, the term "short-chain ester units" as applied to units polymer chain of the copolyetheresters refers to low molecular weight compounds or polymer chain units having molecular weights less than about 550. They are made by reacting a low molecular weight diol or a mixture of diols (molecular weight below about 250) with a dicarboxylic acid to form ester units represented by Formula (B) above.
Included among the low molecular weight diols which react to form short-chain ester units suitable for use for preparing copolyetheresters are acyclic, alicyclic and aromatic dihydroxy compounds. Preferred compounds are diols with about 2-15 carbon atoms such as ethylene, propylene, isobutylene, tetramethylene, 1,4-pentamethylene, 2,2-dimethyltrimethylene, hexamethylene and decamethylene glycols, dihydroxycyclohexane, cyclohexane dimethanol, resorcinol, hydroquinone, 1,5-dihydroxynaphthalene, and the like. Especially preferred diols are aliphatic diols containing 2-8 carbon atoms, and a more preferred diol is 1,4-butanediol. Included among the bisphenols which can be used are bis(p-hydroxy) diphenyl, bis(p-hydroxyphenyl)methane, and bis(p-hydroxyphenyl)propane. Equivalent ester-forming derivatives of diols are also useful (e.g., ethylene oxide or ethylene carbonate can be used in place of ethylene glycol or resorcinol diacetate can be used in place of resorcinol).

As used herein, the term "diols" includes equivalent ester-forming derivatives such as those mentioned. However, any molecular weight requirements refer to the corresponding diols, not their derivatives.

Dicarboxylic acids that can react with the foregoing long-chain glycols and low molecular weight diols to produce the copolyetheresters are aliphatic, cycloaliphatic or aromatic dicarboxylic acids of a low molecular weight, i.e., having a molecular weight of less than about 300. The term "dicarboxylic acids" as used herein includes functional equivalents of dicarboxylic acids that have two carboxyl functional groups that perform substantially like dicarboxylic acids in reaction with glycols and diols in forming copolyetherester polymers. These equivalents include esters and ester-forming derivatives such as acid halides and anhydrides. The molecular weight requirement pertains to the acid and not to its equivalent ester or ester-forming derivative.

Thus, an ester of a dicarboxylic acid having a molecular weight greater than 300 or a functional equivalent of a dicarboxylic acid having a molecular weight greater than 300 are included provided the corresponding acid has a molecular weight below about 300. The dicarboxylic acids can contain any substituent groups or combinations that do not substantially interfere with copolyetherester polymer formation and use of the copolyetherester polymer in the flame retardant compositions of the invention.

As used herein, the term "aliphatic dicarboxylic acids" refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

As used herein, the term "aromatic dicarboxylic acids" refer to dicarboxylic acids having two carboxyl groups each attached to a carbon atom in a carbocyclic aromatic ring structure. It is not necessary that both functional carboxyl groups be attached to the same aromatic ring and where more than one ring is present, they can be joined by aliphatic or aromatic divalent radicals or divalent radicals such as —O— or —SO$_2$—. Representative useful aliphatic and cycloaliphatic acids that can be used sebacic acid; 1,3-cyclohexane dicarboxylic acid; 1,4-cyclohexane dicarboxylic acid; adipic acid; glutaric acid; 4-cyclohexane-1,2-dicarboxylic acid; 2-ethylsuberic acid; cyclopentanedicarboxylic acid, decahydro-1,5-naphthylene dicarboxylic acid; 4,4'-bicyclohexyl dicarboxylic acid; decahydro-2,6-naphthylene dicarboxylic acid; 4,4'-methylenebis(cyclohexyl)carboxylic acid; and 3,4-furan dicarboxylic acid. Preferred acids are cyclohexane dicarboxylic acids and adipic acid.

Representative aromatic dicarboxylic acids include phthalic, terephthalic and isophthalic acids; bibenzoic acid; substituted dicarboxy compounds with two benzene nuclei such as bis(p-carboxyphenyl)methane; p-oxy-1,5-naphthalene dicarboxylic acid; 2,6-naphthalene dicarboxylic acid; 2,7-naphthalene dicarboxylic acid; 4,4'-s sulfonyl dibenzoic acid and $C_1$-$C_{12}$ alkyl and ring substitution derivatives thereof, such as halo, alkoxy, and aryl derivatives. Hydroxy acids such as p-(beta-hydroxyethoxy)benzoic acid can also be used provided an aromatic dicarboxylic acid is also used.

Aromatic dicarboxylic acids are a preferred class for preparing the copolyetherester elastomers useful for this invention. Among the aromatic acids, those with 8-16 carbon atoms are preferred, particularly terephthalic acid alone or with a mixture of phthalic and/or isophthalic acids.

The copolyetherester elastomer preferably comprises from at or about 15 to at or about 99 weight percent short-chain ester units corresponding to Formula (B) above, the remainder being long-chain ester units corresponding to Formula (A) above. More preferably, the copolyetherester elastomers comprise from at or about 20 to at or about 95 weight percent, and even more preferably from at or about 50 to at or about 90 weight percent short-chain ester units, where the remainder is long-chain ester units. More preferably, at least about 70% of the groups represented by R in Formulae (A) and (B) above are 1,4-phenylene radicals and at least about 70% of the groups represented by D in Formula (B) above are 1,4-butylene radicals and the sum of the percentages of R groups which are not 1,4-phenylene radicals and D groups that are not 1,4-butylene radicals does not exceed 30%. If a second dicarboxylic acid is used to prepare the copolyetherester, isophthalic acid is preferred and if a second low molecular weight diol is used, ethylene glycol, 1,3-propanediol, cyclohexanedimethanol, or hexamethylene glycol are preferred.

A blend or mixture of two or more copolyetherester elastomers can be used. The copolyetherester elastomers used in the blend need not on an individual basis come within the values disclosed hereinbefore for the elastomers. However, the blend of two or more copolyetherester elastomers must conform to the values described herein for the copolyetheresters on a weighted average basis. For example, in a mixture that contains equal amounts of two copolyetherester elastomers, one copolyetherester elastomer can contain 60 weight percent short-chain ester units and the other resin can contain 30 weight percent short-chain ester units for a weighted average of 45 weight percent short-chain ester units.

Preferred copolyetherester elastomers include, but are not limited to, copolyetherester elastomers prepared from monomers comprising (1) poly(tetramethylene oxide)glycol; (2) a dicarboxylic acid selected from isophthalic acid, terephthalic acid and mixtures thereof; and (3) a diol selected from 1,4-butanediol, 1,3-propanediol and mixtures thereof, or from monomers comprising (1) poly(trimethylene oxide)glycol; (2) a dicarboxylic acid selected from isophthalic acid, terephthalic acid and mixtures thereof; and (3) a diol selected from 1,4-butanediol, 1,3-propanediol and mixtures thereof, or from monomers comprising (1) ethylene oxide-capped polypropylene oxide)glycol; (2) a dicarboxylic acid selected from isophthalic acid, terephthalic acid and mixtures thereof; and (3) a diol selected from 1,4-butanediol, 1,3-propanediol and mixtures thereof.

Preferably, the copolyetherester elastomers described herein are prepared from esters or mixtures of esters of terephthalic acid and/or isophthalic acid, 1,4-butanediol and poly(tetramethylene ether)glycol or poly(trimethylene ether) glycol or ethylene oxide-capped polypropylene oxide glycol, or are prepared from esters of terephthalic acid, e.g. dimethylterephthalate, 1,4-butanediol and poly(ethylene oxide)glycol. More preferably, the copolyetheresters are prepared from esters of terephthalic acid, e.g. dimethylterephthalate, 1,4-butanediol and poly(tetramethylene ether)glycol.

As a result of their excellent tear strengths, tensile strengths, flex lives, abrasion resistances, and broad useful end-use temperature ranges, thermoplastic polyetherester elastomers are used in a wide range of applications including for example wire and cable coatings, automotive applications, components for household appliances, components for buildings or mechanical devices and tubes and pipes for conveying fluids. Examples of suitable copolyetherester elastomers are commercially available under the trademark Hytrel® from E. I. du Pont de Nemours and Company, Wilmington, Del.

Thermoplastic polyamide copolymers (TPA's) consist of copolymers containing a) hard polyamide segments and b) soft and flexible segments. Examples of TPA's include polyesteramides (PEA's), polyetheresteramides (PEEA's), polycarbonate-esteramides (PCEA's) and polyether-block-amides (PE-b-A's). Preferably, the TPA consists of a linear and regular chain of polyamide segments and flexible polyether or polyester segments or soft segments with both ether and ester linkages as represented by formula (C):

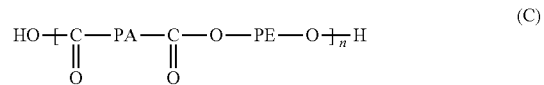

(C)

wherein
"PA" represents a polyamide sequence and "PE" represents for example a polyoxyalkylene sequence formed from linear or branched aliphatic polyoxyalkylene glycols or a long-chain polyol with either ether or ester or both linkages and mixtures thereof or copolyethers or copolyesters derived therefrom. The polyamide may be aliphatic or aromatic. The softness of the copolyetheramide or the copolyesteramide block copolymers generally decreases as the relative amount of polyamide units is increased. Examples of thermoplastic polyamide block copolymers suitable for use in the compositions of the invention are commercially available from Arkema or Elf Atochem under the trademark Pebax®.

Thermoplastic polyolefinic elastomers (TPO's) consist of certain rubbery olefin-type polymers, for example propylene or polyethylene, as well as thermoplastics blended with a rubber. Examples of thermoplastic polyolefinic elastomers (TPO's) include random block copolymers such as alpha-olefin copolymers, including ethylene-propylene copolymers (EPM), ethylene propylene diene copolymers (EPDM), copolymers of ethylene or propylene or butene with higher alpha-olefin copolymers (e.g. ethylene-hexene, ethylene-octene (for example Engage® which is commercially available from The Dow Chemical Co.)); random stereoblock polypropylene; hydrogenated diene block copolymers such as hydrogenated polybutadiene and hydrogenated polyisoprene, a mixture of hydrogenated polybutadiene and polybutadiene; graft copolymers such as EPDM-g-polypivalolactone (PPVL). Other examples are polyolefin blend thermoplastic elastomers such as for example blends of EPM or EPDM with isotactic polypropylene (iPP), and blends of EPM or EPDM with polyethylene and polypropylene.

Styrenic thermoplastic elastomers (TPS's) consist of block copolymers of styrene and rubbery polymeric materials like for example polybutadiene (TPS-SBS), a mixture of hydrogenated polybutadiene and polybutadiene, poly(ethylene-butylene) (TPS-SEES), polyisoprene (TPS-SIS) and polyethylene-propylene) (TPS-SEPS).

Thermoplastic polyurethanes (TPU's) consist of linear segmented block copolymer composed of hard segments comprising polyisocyanate and a chain extender and soft segments comprising diisocyanate and a long chain polyol as represented by the general formula (D):

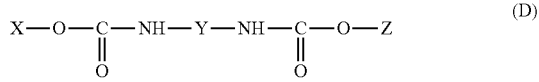

wherein
"X" represents a hard segment comprising a polyisocyanate and a chain extender, preferably a short-chain glycol, "Z" represents a soft segment comprising a polyisocyanate and a long-chain polyol and "Y" represents the residual group of the polyisocyanate compound of the urethane bond linking the X and Z segments. Preferably, the polyisocyanate is a diisocyanate. Examples of diisocyanate are 4,4'-diphenylmethane diisocyanate (MDI), toluene diisocyanate (TDI), hexamethylene diisocyanate (HDI), 4,4'-dicyclohexylmethane diisocyanate (H12-MDI), trans-trans-4,4'-dicyclohexylmethane diisocyanate, biphenyl diisocyanate (TODI) and 1,4-benzene diisocyanate. The long-chain polyol includes those of a polyether type such as poly(alkylene oxide)glycol or those of polyester type.

Flame retardance in the flame retardant thermoplastic elastomer compositions described herein is imparted by flame retardant mixtures also referred herein as flame retardant compositions. These flame retardant mixtures b) comprise a flame retardant b1) which is a phosphinate of the formula (I) (i.e. a monophosphinate) and/or a diphosphinate of the formula (II) and/or polymers of (I) and/or (II),

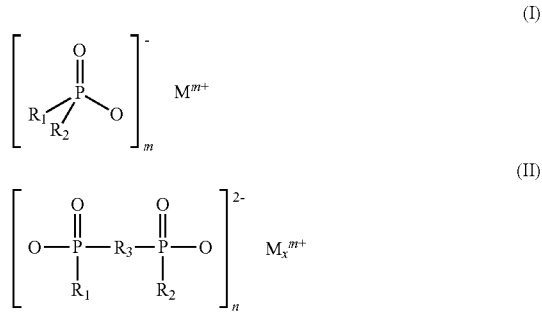

wherein $R_1$ and $R_2$ are identical or different and are hydrogen, linear or branched $C_1$-$C_6$ alkyl groups, and/or aryl groups; $R_3$ is a linear or branched $C_1$-$C_{10}$-alkylene group, a $C_6$-$C_{10}$-arylene group, an alkylarylene group or arylalkylene group; M is calcium, magnesium, aluminum, and/or zinc; m is 2 to 3; n is 1 or 3; and x is 1 or 2.

$R_1$ and $R_2$ may be identical or different and are preferably hydrogen, methyl, ethyl, n-propyl, isopropyl, n-butyl, tert-butyl, n-pentyl and/or phenyl. $R_3$ is preferably methylene, ethylene, n-propylene, isopropylene, n-butylene, tert-butylene, n-pentylene, n-octylene, n-dodecylene, or phenylene or naphthylene, or methylphenylene, ethylphenylene, tert-butylphenylene, methylnaphthylene, ethylnaphthylene or tert-butylnaphthylene, or phenylmethylene, phenylethylene, phenylpropylene or phenylbutylene. M is preferably aluminum or zinc.

By polymers of the compounds of formulas (I) and (II) is meant species containing oligomers or condensation products of the phosphinate and diphosphinate anion moieties.

Preferred phosphinates are metal salts of organic phosphinates, such as metal salts of methylethylphosphinates and diethylphosphinates. More preferred are aluminum methylethylphosphinate, aluminum diethylphosphinate, zinc methylethylphosphinate, and zinc diethylphosphinate. More preferably, the flame retardant is aluminum phosphinate, magnesium phosphinate, calcium phosphinates and/or zinc phosphinate and still more preferably, the flame retardant is aluminum phosphinate, aluminum diethyl phosphinate and/or zinc diethyl phosphinate.

Although the flame retardant composition may contain both a phosphinate and a diphosphinate or a diphosphinate alone, preferred compositions contain monophosphinates due to cost and availability.

The flame retardant b1) is usually in the form of particles which may have any particle size distribution, as commonly understood and used by those having skill in the field, but preferably the phosphinate and/or diphosphinates that comprise component b1) have particle sizes (D90 value) of less than or equal to 100 microns and more preferably less than or equal to 20 microns. The D90 value corresponds to a particle size below which 90 weight percent of the particles lie, wherein the particle size distribution is measured by the technique of laser diffraction from a suspension of particles in a solvent using a particle size analyzer; Mastersizer 2000 from Malvern. This test method meets the requirements set forth in ISO 13320.

Preferably, the flame retardant mixtures b) comprise a flame retardant b1) in an amount from at or about 30 to at or about 85 weight percent, the weight percentage being based on the total weight of the flame retardant mixture, i.e. the sum of components b1)+b2)+b3).

The flame retardant mixtures b) described herein comprise a phosphorous-containing amino composition, b2), that is a melamine phosphate, a derivative of a melamine phosphate or mixtures thereof, a reaction product of ammonia with phosphoric acid or a polyphosphate thereof, for example melamine pyrophosphate or ammonium polyphosphate or mixtures thereof, in an amount such that the amount of b2) is lower than the amount of b1). Preferably the amount of b2) is greater than 10 to at or about 30 weight percent, the weight percentage being based on the total weight of the flame retardant mixture, i.e. the sum of components b1) b2) b3). Suitable phosphorous-containing amino compositions that are reaction products of ammonia with phosphoric acid or a polyphosphate derivative thereof include ammonium hydrogenphosphate, ammonium dihydrogenphosphate and ammonium polyphosphate. More preferably, the phosphorous-containing amino compositions comprises melamine pyrophosphate or ammonium polyphosphate. Suitable phosphorous-containing amino compositions that are melamine phosphates include melamine orthophosphate ($C_3H_6N_6H_3O_4P$), dimelamine orthophosphate ($C_3H_6N_6H_3O_4P)_2$, melamine polyphosphate, dimelamine pyrophosphate, and melamine pyrophosphate. Derivatives of melamine phosphates include, for example, melem polyphosphate, melam polyphosphate and melamine borophosphates.

The material known as melamine pyrophosphate is a compound defined by the nominal formula $(C_3H_6N_6)_2H_4P_2O_7$. Commercially available grades of melamine pyrophosphate may have substantial impurities in terms of having a different ratio of phosphorous to nitrogen and/or containing other phosphorous containing anions. See U.S. Pat. No. 5,814,690. Nevertheless, any compound having the nominal melamine pyrophosphate formula above or sold commercially as melamine pyrophosphate is suitable for use in the flame retardant compositions of the invention and falls within the scope of the recited invention.

The phosphorous-containing amino composition may also comprise coated particles, for example particles that have a core comprising melamine pyrophosphate and a coating comprising an organosilane, ester, polyol, dianhydride, dicarboxylic acid, melamine formaldehyde, or mixtures thereof. Such coated compositions are disclosed in U.S. Pat. No. 6,015,510, the teaching of which is incorporated herein by reference. An example of a suitable coated melamine pyrophosphate is a melamine pyrophosphate coated with 0.6±0.1 wt. % Silquest® A-1100 silane. Alternatively, the coating agent may be added to the phosphorous-containing composition in a separate step prior to blending with one or more components of the composition of the invention or in a step wherein all components are mixed together. In such cases, the amount of coating agent will generally be in the range of from about 0.1 to about 6 wt. %, based on the weight of the coated phosphorous-containing composition.

The flame retardant mixture b) described herein also comprises from at or about 10 to at or about 40 weight percent of a zeolite b3), the weight percentage being based on the total weight of the flame retardant mixture, i.e. the sum of components b1) b2) b3). Zeolites are hydrous tectosilicate minerals characterized by a three-dimensional aluminosilicate tetrahedral framework. The framework contains channels and interconnected voids occupied by ion-exchangeable cations and loosely held water molecules permitting reversible dehydration. Preferred zeolites are represented by the general formula (III):

$$M_{2/n}O.Al_2O_3.xSiO_2.yH_2O \qquad (III)$$

wherein
M is a metal selected from alkali and alkaline earth metals, V, Mo, Mn, Fe, Co, Ni, Cu, Zn, Sb, Bi and mixtures thereof;
n is the cation valence;
x is from 0.1 and 20; and
y is the number of moles of water of crystallization and has a value of 0 to 20.

The zeolite b3) component may be naturally occurring or synthetically prepared. Examples of naturally occurring zeolites include analcite, analcime, cancrinite, chabazite, clinoptilolite, erionite, faujacite, heulandite, mordenite, natrolite, nosean, phillipsite and stilbite. Particularly suitable is a zeolite Y type.

It is generally preferred that zeolites are used in the form having an equilibrium moisture content, which is generally around 20-30 wt. %, based on the weight of the zeolite. Oven-drying may alter the pore structure of the zeolite, which is undesirable.

The flame retardant composition comprising the three components b1), b2) and b3) is itself a novel composition that may be used as an intumescent additive in a variety of polymeric compositions wherein flame retardance and smoke suppression is desired. Intumescence refers to a specific chemical reaction described as the formation, during combustion, of a foaming char instead of combustible gases. The charred layer serves as a physical barrier, which slows down heat and mass transfer between the gas and the condensed phases. The composition may be used to impart flame retardancy and smoke suppression properties to a wide range of polymers, for example thermoplastics, elastomers and thermoplastic elastomers, including thermoplastic vulcanizates, copolyester thermoplastic elastomers, thermoplastic polyamide copolymers, thermoplastic polyolefinic elastomers, styrenic thermoplastic elastomers, thermoplastic polyurethanes, copolyetherester elastomers, copolyesterester elastomers, polychloroprene, EPDM rubber, fluoroelastomers and ethylene acrylic elastomers.

The phosphorus-containing amino composition b2) in the flame retardant mixture described herein is preferably used in combination with other ingredients to form an intumescent system, i.e. the phosphorus-containing amino composition b2) is comprised in the intumescent system. The intumescent system comprises at least three components; b2) as an acid source; a carbonific agent; and a spumific agent.

The acid source, the carbonific agent and the spumific agent may, in certain instances, be the same chemical compound. In such instances, the compound will function as one or more of acid source, carbonific agent and spumific agent. For example, melamine polyphosphate can act as an acid source and a blowing agent. When an intumescent system comprising the phosphorus-containing amino composition b2) described herein is used in the flame retardant mixtures described herein, the intumescent system is generally present in the flame retardant mixture in an amount from at or about 15 to at or about 70 weight percent, preferably from at or about 15 to at or about 65 weight percent, more preferably from at or about 15 to at or about 60 weight percent of the flame retardant mixture, the weight percent being based on the total weight of the flame retardant mixture, i.e. the sum of a) component b1), plus the intumescent system, plus the zeolite component b3) and wherein the intumescent system is the sum of the phosphorous-containing amino component b2), the carbonific agent and the spumific agent.

The acid source b2) is a material that yields acidic species, for example, upon heat exposure and acts as a catalyst. The acid source b2) in the intumescent system is the same as described in the preceding paragraphs above for the phosphorous-containing amino composition b2). With the aim of increasing thermal stability, improving water resistance and improving dispersibility within the thermoplastic resin, the acid source b2) may be coated, as described above for b2).

The carbonific agent in the intumescent system is also known as a carbon source, char-promoting agent, char-forming agent or carbonization compound. The carbonific agent is an organic compound which will react with the liberated acidic species to yield a carbon char. The carbonific agent is preferably selected from the group consisting of polyhydric alcohols, saccharides, alkylol melamines, polyol(alkyl carbonates) phenol-formaldehyde resins, char-forming polymers, and mixtures of these. Examples of polyhydric alcohols include without limitation pentaerythritol, dipentaerythritol, tripentaerythritol and polycondensates of pentaerythritol. Examples of saccharides include without limitation starches and their derivatives, dextrins, cyclodextrins, D-mannose, glucose, galactose, sucrose, fructose, xylose, arabinose, D-mannitol, D-sorbitol, D- or L-arabitol, xylitol, inositol, adonitol, dulcitol, iditol, talitol, allitol, altritol, guilitol, erythritol and threitol. Examples of char-forming polymers include without limitation polyamides, thermoplastic polyurethanes and polycarbonates.

The spumific agent in the intumescent system is also known as a blowing agent or expanding agent and is a compound that generates non-flammable gases, such as carbon dioxide ($CO_2$), water, nitrogen ($N_2$) and ammonia, each of which causes the char to swell. The spumific agent is preferably selected from amines, amides, ureas, guanidines, guanamines, triazines, melamines, amino acids, and salts of these. Examples of salts of amines, amides, ureas, guanidines, guanamines, triazines, melamines, and amino acids include phosphates, phosphonates, phosphinates, borates, cyanurates and sulfates. Examples of amines and salts of these include without limitation ammonium phosphates, ammonium pyrophosphates, ammonium polyphosphates, ethylenediamine phosphates, ammonium cyanurates and ammonium borates. Examples of melamine salts include without limitation melamine phosphates (e.g. melamine orthophosphate, melamine diphosphate, melamine polyphosphate), melamine cyanurates, melamine borates, melamine borophosphates, melamine silicates, melamine 1,2-phthalates, melamine 1,3-phthalates, melamine 1,4-phthalates, melamine guanidates and melamine oxalates.

The flame retardant polymer compositions described herein may further comprise additives that include, but are not limited to, one or more of the following components as well as combinations of these: metal deactivators, such as hydrazine and hydrazide; heat stabilizers; antioxidants; modifiers; colorants, lubricants, fillers and reinforcing agents, impact modifiers, flow enhancing additives, antistatic agents, crystallization promoting agents, conductive additives, viscosity modifiers, nucleating agents, plasticizers, mold release agents, scratch and mar modifiers, drip suppressants, adhesion modifiers and other processing aids known in the polymer compounding art. When used, additional additives are preferably present in amounts of about 0.1 to about 20 weight percent, based on the total weight of the flame retardant polymer composition. In a preferred embodiment, the additive comprises a high molecular weight polysiloxane. The use of a high molecular weight polysiloxane as an additive in the flame retardant compositions described herein improves the extrudability and the abrasion resistance of the compositions. When used, high molecular weight polysiloxanes are preferably present in amounts of about 0.05 to about 1.75 weight percent, based on the total weight of the flame retardant polymer composition.

The flame retardant compositions disclosed herein may further comprise agents that increase softness, such as poly (meth)acrylate or polyethylene/(meth)acrylate rubber. As used herein, the term "(meth)acrylate" refers to methacrylate and/or acrylate and the term "poly(meth)acrylate refers to polymers derived from the polymerization of methacrylate and/or acrylate monomers. The acrylate rubber may be prepared by copolymerizing one or more (meth)acrylate monomers with one or more olefins. A preferred olefin is ethylene. Preferably, the acrylate rubbers include poly(alkyl(meth) acrylate) rubbers, ethylene/alkyl(meth)acrylate copolymer rubbers and poly(perfluoroalkyl(meth)acrylate) rubbers. More preferably the acrylate rubbers are ethylene/alkyl (meth)acrylate copolymer rubbers where the alkyl group has from 1 to 4 carbons. Preferred ethylene/alkyl(meth)acrylate copolymers are those derived from less than about 80 weight percent of ethylene and more than about 20 weight percent alkyl(meth)acrylate. The acrylate rubbers may optionally comprise additional repeat units derived from one or more functionalized comonomers, such as (meth)acrylate glycidyl esters (such as glycidyl methacrylate), maleic acid, or other comonomers having one or more reactive groups including acid, hydroxyl, epoxy, isocyanates, amine, oxazoline, chloroacetate, or diene functionality. The acrylate rubbers may also be prepared from more than two (meth)acrylate monomers. Examples are acrylate rubbers made by polymerizing ethylene, methyl acrylate, and a second acrylate (such as butyl acrylate).

The additives described above may be present in the flame retardant polymer compositions of the invention in amounts and in forms known in the art, including in the form of so-called nanomaterials where at least one of the dimensions of the particles is in the range of 1 to 1000 nm. The flame retardant polymer compositions described herein are melt-mixed blends, wherein all of the polymeric components are well-dispersed within each other and all of the non-polymeric ingredients are well-dispersed in and bound by the polymer matrix, such that the blend forms a unified whole. Any melt-mixing method may be used to combine the polymeric components and non-polymeric ingredients of the present invention.

The polymeric components and non-polymeric ingredients of the flame retardant polymer compositions of the invention may be added to a melt mixer, such as, for example, a single or twin-screw extruder; a blender; a single or twin-screw kneader; or a Banbury mixer, either simultaneously through a single step addition, or in a stepwise fashion, and then melt-mixed. When adding the polymeric components and non-polymeric ingredients in a stepwise fashion, part of the polymeric components and/or non-polymeric ingredients are first added and melt-mixed with the remaining polymeric components and non-polymeric ingredients being subsequently added and further melt-mixed until a well-mixed composition is obtained. When long-length fillers such as for example long glass fibers are used in the composition, pultrusion may be used to prepare a reinforced composition.

The components of the intumescent additive mixture may be combined by mixing in a blender, Banbury mixer, roll mill, or any method for mixing and dispersing chemical compounds known to those skilled in the art, so long as the method does not result in degradation of the components. The components of the intumescent additive mixture may also be blended individually with the flame retardant additive b1) and/or the thermoplastic elastomer by a method that does not degrade the ingredients of the intumescent mixture, for example in a Banbury mixer or an extruder.

Also described herein are uses of a flame retardant composition (i.e. a flame retardant mixture) comprising i) b1) the at least one flame retardant comprising a phosphinate of the formula (I); and/or a diphosphinate of the formula (II); and/or polymers of (I) and/or (II) as described herein, ii) phosphorous-containing amino composition b2), and iii) the zeolite b3) described herein for imparting flame retardance and low smoke emission to a composition comprising a) the one or more thermoplastic resins as described herein or other polymers that may be thermoplastic resins, thermoplastic elastomers or elastomers, wherein the flame retardant composition (i.e. b1) plus b2) plus b3)) is present in the flame retardant polymer composition in an amount from at or about 18 to at or about 50 weight percent, the weight percentage being based on the total weight of the flame retardant polymer composition and wherein b1) is present in the flame retardant polymer composition in an amount from at least 15 weight percent, preferably from at or about 15 to 25 weight percent based on the total weight of the flame retardant polymer composition, and b2) is present in the flame retardant polymer composition in an amount such that the amount of b2) is lower than the amount of b1), preferably in an amount from at or about 5 to at or about 15 weight percent based on the total weight of the flame retardant polymer composition. Preferably, b3) is present in the flame retardant polymer composition in an amount of at least 5 weight percent, even more preferably in an amount from at or about 5 to at or about 20 weight percent, based on the total weight of the flame retardant polymer composition.

Also described herein are methods for imparting flame retardance and low smoke emission to an article made of a flame retardant polymer composition, the method comprising melt blending a) the one or more thermoplastic elastomers described herein with a flame retardant composition comprising b1) the at least one flame retardant comprising a phosphinate of the formula (I); and/or diphosphinate of the formula (II); and/or polymers of (I) and/or (II) as described herein, b2) the phosphorous-containing amino composition selected from the group consisting of reaction products of ammonia with phosphoric acid, polyphosphates of said reaction products, and mixtures thereof; and b3) the zeolite described herein, wherein the flame retardant composition is present in an amount from at or about 18 to at or about 50 weight percent (the weight percentage being based on the total weight of the flame retardant polymer composition), b1) is present in the flame retardant composition in an amount from at or about 30 to at or about 85 weight percent, b2) is present in the flame retardant composition in an amount greater than 10 to at or about 30 weight percent, and b3) is present in the flame retardant composition in an amount from at or about 10 to at or about 40 weight percent, provided that the sum b1) b2) b3) is 100%, so as to form a flame retardant polymer composition and shaping said flame retardant polymer composition.

Also described herein are methods for imparting flame retardance and low smoke emission to an article made of a flame retardant polymer composition, the method comprising melt blending the intumescent additive composition described herein, the component b1) component and the one or more thermoplastic elastomers described herein.

The flame retardant polymer compositions described herein may be shaped into articles using methods known to those skilled in the art, such as injection molding, blow molding, injection blow molding, extrusion, thermoforming, melt casting, vacuum molding, rotational molding, calendar molding, slush molding, filament extrusion and fiber spinning. Such articles may include films, fibers and filaments, wire and cable coatings; photovoltaic cable coatings, optical fiber coatings, tubing and pipes; fabrics or texiles made fibers and filaments, e.g., used in clothing or carpets; films and membranes such breathable membranes in roofing and building/construction; motorized vehicle parts such as body panels, air bag doors, dashboards, engine covers, rocker panels or air filter covers; components for household appliances, such as washers, dryers, refrigerators and heating-ventilation-air conditioning appliances; connectors in electrical/electronic applications; components for electronic devices, such as computers; components for office-, indoor-, and outdoor-furniture; and footwear components.

EXAMPLES

The invention is further illustrated by certain embodiments in the examples below which provide greater detail for the compositions, uses and processes described herein.

The following materials were used to prepare the flame retardant polymer compositions described herein and the compositions of the comparative examples.

Copolyester Thermoplastic Elastomer (TPC): a copolyetherester elastomer comprising about 44.9 weight percent of poly(tetramethylene oxide) having an average molecular weight of about 1000 g/mol as polyether block segments, the weight percentage being based on the total weight of the copolyetherester elastomer, the short chain ester units of the copolyetherester being polybutylene terephthalate and polybutylene isophthalate segments. As required for the manufacturing process and well-known to those skilled in the art, the copolyetherester elastomer contained up to 6 weight percent of heat stabilizers, antioxidants and metal deactivators.

Phosphinate flame retardant: Exolit® OP935, an aluminum salt of diethyl phosphinate having a D90 max of 7.506 microns supplied by Clariant.

Melamine pyrophosphate (MPP): MelBan 13-1100 supplied by Hummel Croton, Inc., South Plainfield, N.J., USA.

Coated melamine pyrophosphate: a melamine pyrophosphate coated with 0.6±0.1 wt. % Silquest® A-1100 silane.

Ammonium polyphosphate: Budit® 3168 supplied by Budenheim. Germany

Zeolite: Zeolyst™ CBV100 supplied by Zeolyst International, Conshohocken, Pa., USA. This product is a Y type zeolite (NaY) of a FAU framework type having the following characteristics:

$SiO_2/Al_2O_3$ mole ratio: 5.1;
nominal cation form: sodium;
$Na_2O$ weight percent: 13.0;
unit cell size: 24.65 A;
surface area: 900 m2/g, For each composition of an Example or composition of a Comparative Example, the materials in the amount listed in Table 1 were melt blended in a 30 mm twin screw extruder (Coperion ZSK 30) operated at a barrel temperature of about 220° C. to 240° C. using a screw speed of about 150 rpm to 250 rpm and a throughput of about 6 to about 12 kg/hour. The compounded melt blended mixtures were extruded in the form of narrow strips (or bands) having an average thickness as indicated in the Table. Quantities shown in the Table are presented in weight percent on the basis of the total weight of the composition.

In the Table, compositions of the Examples are identified as "E" and compositions of the Comparative Examples are identified as "C". Table 1 provides a list of components corresponding to compositions E1 to E6 and compositions C1 to C3.

The following test methods were used to determine physical properties.

Flame Retardance

Flammability testing was performed according to UL 94 test standard, 20 mm vertical burning test. Test specimens were prepared from the compositions of the table by melt-extruding narrow flat strips in a standard extruder having barrel temperatures set at about 220° C. to about 240° C. Test specimens, in the shape of rectangular bars of dimension 125 mm long by 13 mm wide, were cut from the thus-obtained flat strips.

Test specimens were clamped with the longitudinal axis vertical to position the lower edge of the specimen was 300 mm above a horizontal layer of dry absorbent surgical cotton. A burner producing a blue flame 20 mm high was placed so that the flame was applied centrally to the mid-point of the lower edge of the specimen for 10 seconds. After the application of the flame to the specimen for 10 seconds, the burner was withdrawn from the sample and the after-flame time, $t_1$, was measured. When after-flaming of the test specimen stopped, the burner was replaced beneath the specimen for an additional 10 seconds. The flame was then withdrawn from the sample and the second after-flame time, $t_2$, was measured. Materials were classified according to the test specifications as V-0, V-1 or V-2, based on the behavior of the composition during burning. When the composition failed to meet the criteria for the least demanding classification (V-2), it is reported as "failed" in the table.

Flammability was measured for all compositions after they had been preconditioned for at least 48 hours at 23° C. and 50 percent relative humidity.

Smoke Emission Method

Equipment and Set-Up Method

The equipment included a heat source which was a laboratory burner according to UL 94 standard "Tests for Flammability of Plastic Materials for Parts in Devices and Appliances". Gas supply—a supply of technical grade methane gas with regulator and meter for uniform gas flow.

The sample holder was a porcelain crucible which was inert to the material being tested. The crucible had a height of 36 mm and an external to diameter of 45 mm (model VWR 102/45 DIN). The crucible was placed within a triangular porcelain holder having a height of 47 mm and sides of 56 mm. The triangular holder was attached via wire means onto a three-legged support having a height of 220 mm, an external diameter of 170 mm and a wall thickness of round section of 15 mm. The height of the crucible with respect to the laboratory burner was adjusted so that the top of the flame touched and was centrally positioned to touch the bottom of the crucible. A round piece of aluminum foil of external diameter 120 mm having a center circular hole of 44 mm diameter and sufficient to fit the crucible was placed atop the triangular holder.

A glass chimney having a total height of 300 mm, a bottom inside diameter of 100 mm, a height of cylinder before striction of 270 mm, and a top inside diameter of 50 mm was placed atop and in direct contact with the aluminum foil. A plastic cone having holes was fitted into the top section of the glass chimney; the cone having a bottom inside diameter of 46 mm, a top inside diameter of 32 mm, a height of 94 mm and a height remaining above the top surface of the chimney of 68 mm; the cone had 22 open holes of diameter 5 mm. A metal plate was placed atop the upper surface of the plastic cone, the metal plate having dimensions such that it was at least as large as the upper surface of the plastic cone. The glass chimney was supported in place by means of at least one point fixed to a vertical metal stand.

A photometric system of the following type was also used—Light Source: Model Makita ML700 flashlight; Lens diameter 21 mm; Power 7.2V, capacity 1.3 Ah. Receiver—Photocell: Glass-EVA-cell-EVA-glass laminated system. The EVA was a Vistasolar® film type 486.10 from ETIMEX Solar GmbH (Dietenheim, Germany); the cell was a polycrystalline silicone cell from Q-cells AG type Q6LTT-180/1410 having an edge length of 156 mm and an efficiency of >=14.1%. Standard lamination conditions at 140° C. for 18 minutes were followed. The photocell was Kapton® taped at the edges and had a final dimension of 200 mm×200 mm.

For data collection, an Oscilloscope Model LeCroy 9304 Quad 175 MHz was used. The light source and the receiver were placed on the left and right side respectively of the glass chimney and in the center of the chimney walls. The distance between the light source and the outer left surface of the chimney was 160 mm and the distance between the outer right surface of the chimney and the receiver was 360 mm. The receiver was connected to the oscilloscope and the signal output in volts was recorded.

All equipment except the oscilloscope was placed inside a laboratory fume hood according to UL 94 standard "Tests for Flammability of Plastic Materials for Parts in Devices and Appliances". The fume hood used was from Atlas Fire Science Products, Plastics HVUL. To prevent concentration of fumes inside the hood a light aspiration was maintained in the fume hood. A protection shield was placed around the laboratory burner to prevent any instability in the flame. After completion of each measurement the fume hood ventilation system was opened to permit complete exhaust of the fumes.

Examples 1 to 6 and Comparative Examples C1 to C3

Table 1 shows that composition C1, comprising only a phosphinate flame retardant, exhibited flame retardance but minimum light transmission, i.e. "0.15" indicating relatively high smoke emission. The compositions C2 and C3 contained the same amount of flame retardant as C1 and contained zeolite. C2 and C3 exhibited high smoke emission.

E1 to E6 exhibit good flame retardance and improved smoke emission relative to C1, C2 and C3.

TABLE 1

| | C1 | C2 | C3 | E1 | E2 | E3 | E4 | E5 | E6 |
|---|---|---|---|---|---|---|---|---|---|
| TPC | 85 | 83 | 80 | 75 | 72 | 75 | 72 | 75 | 72 |
| Exolit ® OP935 | 15 | 15 | 15 | 15 | 15 | 15 | 15 | 15 | 15 |
| Coated melamine pyrophosphate | | | | 5 | 8 | | | | |
| Uncoated melamine pyrophosphate | | | | | | 5 | 8 | | |
| Zeolite | | 2 | 5 | 5 | 5 | 5 | 5 | 5 | 5 |
| Budit ® 3168 | | | | | | | | 5 | 8 |
| UL-V (t1 + t2)avg (sec) | 3.33 | 3 | 6.66 | 3 | 8.7 | 5 | 4.7 | 16 | 11.7 |
| UL-V rating | V-0 | V-2 | V-2 | V-2 | V-2 | V-2 | V-2 | V-2 | V-2 |
| Band thickness avg (mm) | 1.8 | 1.8 | 1.6 | 1 | 1.8 | 1 | 1.1 | 2 | 1.5 |
| (lt/lo)sample | 0.15 | 0.12 | 0.13 | 0.38 | 0.42 | 0.30 | 0.20 | 0.50 | 0.61 |
| (lt/lo)ref | 0.69 | 0.69 | 0.69 | 0.69 | 0.69 | 0.69 | 0.69 | 0.69 | 0.69 |

What is claimed is:

1. A flame retardant polymer composition comprising:

a) one or more thermoplastic elastomers; and b) from at or about 18 to at or about 50 weight percent, based on the total weight of the flame retardant polymer composition, of a flame retardant mixture comprising:

b1) at least one flame retardant comprising a material selected from the group consisting of phosphinates of the formula (I); diphosphinates of the formula (II); polymers of (I); polymers of (II); and mixtures of two or more thereof (I)

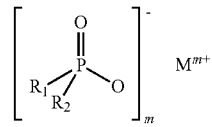

-continued

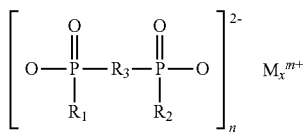
(II)

wherein $R_1$ and $R_2$ are independently selected from hydrogen, linear or branched $C_1$-$C_6$ alkyl groups, and aryl groups; $R_3$ is a linear or branched $C_1$-$C_{10}$-alkylene group, a $C_6$-$C_{10}$-arylene group, an alkylarylene group or an arylalkylene group; M is selected from the group consisting of calcium, magnesium, aluminum, zinc and mixtures thereof; m is 2 to 3; n is 1 or 3; and x is 1 or 2;

b2) a phosphorous-containing amino composition selected from the group consisting of melamine phosphates, derivatives of melamine phosphates and mixtures thereof, reaction products of ammonia with phosphoric acid, polyphosphates of said reaction products, and mixtures thereof; and b3) a zeolite, wherein i) b1) is present in the flame retardant polymer composition in an amount greater than or equal to 15 weight percent based on the total weight of the flame retardant polymer composition, and ii) b2) is present in the flame retardant mixture in an amount such that the amount of b2) is less than the amount of b1).

2. A flame retardant polymer composition according to claim 1, wherein the one or more thermoplastic elastomers are copolyetherester elastomers having a multiplicity of recurring long-chain ester units and short-chain ester units joined head-to-tail through ester linkages, said long-chain ester units being represented by formula (A):

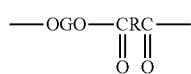
(A)

and said short-chain ester units being represented by formula (B):

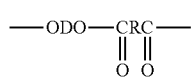
(B)

wherein:

G is a divalent radical remaining after the removal of terminal hydroxyl groups from poly(alkylene oxide)glycols having a number average molecular weight of between about 400 and about 6000;

R is a divalent radical remaining after removal of carboxyl groups from a dicarboxylic acid having a molecular weight of less than about 300; and D is a divalent radical remaining after removal of hydroxyl groups from a diol having a molecular weight less than about 250.

3. A flame retardant polymer composition of claim 2, wherein the one or more thermoplastic elastomers are copolyetherester elastomers prepared from monomers comprising (1) poly(tetramethylene oxide)glycol; (2) a dicarboxylic acid selected from the group consisting of isophthalic acid, terephthalic acid and mixtures thereof; and (3) a diol selected from the group consisting of 1,4-butanediol, 1,3-propanediol and mixtures thereof.

4. A flame retardant polymer composition of claim 2, wherein the one or more thermoplastic elastomers are copolyetherester elastomers prepared from monomers comprising (1) poly(trimethylene oxide)glycol; (2) a dicarboxylic acid selected from the group consisting of isophthalic acid, terephthalic acid and mixtures thereof; and (3) a diol selected from the group consisting of 1,4-butanediol, 1,3-propanediol and mixtures thereof.

5. A flame retardant polymer composition of claim 2, wherein the one or more thermoplastic elastomers are copolyetherester elastomers prepared from monomers comprising (1) ethylene oxide-capped polypropylene oxide)glycol; (2) dicarboxylic acids selected from the group consisting of isophthalic acid, terephthalic acid and mixtures thereof; and (3) a diol selected from the group consisting of 1,4-butanediol, 1,3-propanediol and mixtures thereof.

6. A flame retardant polymer composition of claim 1, wherein the at least one flame retardant b1) is selected from the group consisting of aluminum phosphinate, diethyl phosphinate and/or zinc diethyl phosphinate.

7. A flame retardant polymer composition of claim 1, wherein the zeolite b3) is represented by the general formula $$M_{2/n}O.Al_2O_3.xSiO_2.yH_2O$$

wherein

M is a metal selected from alkali and alkaline earth metals, V, Mo, Mn, Fe, Co, Ni, Cu, Zn, Sb, Bi and mixtures thereof;

n is the cation valence;

x lies between 0.1 and 20; and y is the number of moles of water of crystallization and has a value of 0 to 20.

8. A flame retardant polymer composition of claim 1 wherein the amount of zeolite b3) is greater than or equal to 5 weight percent, based on the total weight of the flame retardant polymer composition.

9. A flame retardant polymer composition of claim 1 wherein b2) is selected from melamine pyrophosphate or ammonium polyphosphate.

10. A flame retardant polymer composition of claim 1 wherein the phosphorous-containing amino composition comprises ammonium polyphosphate.

11. A flame retardant polymer composition of claim 1 wherein b3) is present in the composition in an amount greater than or equal to 5 weight percent based on the total weight of the flame retardant polymer composition.

12. A flame retardant polymer composition claim 1 wherein the flame retardant mixture b) comprises b1) which is present in the flame retardant polymer composition in an amount from at or about 15 to 25 weight percent based on the total weight of the flame retardant polymer composition, b2) is present in the flame retardant polymer composition in an amount from at or about 5 to 15 weight percent based on the total weight of the flame retardant polymer composition and b3) is present in the flame retardant polymer composition in an amount from at or about 5 to 20 weight percent based on the total weight of the flame retardant polymer composition.

13. A molded, extruded, or shaped article and a fiber or a filament comprising the flame retardant polymer composition recited in claim 1.

14. A wire, a cable or an optical cable comprising a coating made of the flame retardant polymer composition recited in claim 1.

15. A flame retardant composition comprising
A) at least one flame retardant comprising a material selected from the group consisting of phosphinates of the formula (I); diphosphinates of the formula (II); polymers of (I); polymers of (II); and mixtures of two or more thereof;

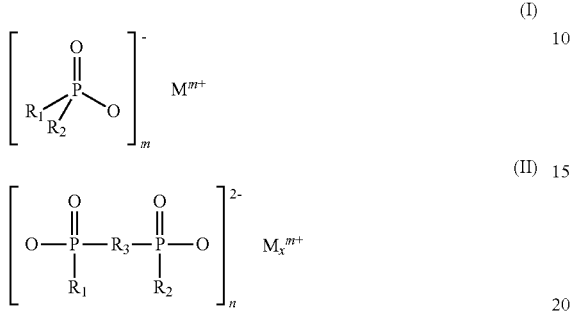

wherein $R_1$ and $R_2$ are independently selected from hydrogen, linear or branched $C_1$-$C_6$ alkyl groups, aryl groups and mixtures thereof; $R_3$ is a linear or branched $C_1$-$C_{10}$ alkylene group, a $C_6$-$C_{10}$ arylene group, an alkylarylene group or an arylalkylene group; M is selected from the group consisting of calcium, magnesium, aluminum, zinc and mixtures thereof; m is 2 to 3; n is 1 or 3; and x is 1 or 2;

B) a phosphorous-containing amino composition selected from the group consisting of reaction products of ammonia with phosphoric acid, polyphosphates of said reaction products, and mixtures thereof; and C) a zeolite wherein A) is present in the flame retardant composition in an amount from at or about 30 to at or about 85 weight percent, ii) B) is present in the flame retardant composition in an amount greater than 10 to at or about 30 weight percent, and iii) C) is present in the flame retardant composition in an amount from at or about 4 to at or about 40 weight percent, provided that the sum A)+B)+C) is 100 weight percent.

16. The flame retardant composition of claim 15 wherein the phosphorous-containing amino composition comprises ammonium polyphosphate.

17. A flame retardant polymer composition comprising from at or about 18 to at or about 50 weight percent of the flame retardant composition of claim 15 and a polymer, wherein the weight percentage is based on the total weight of the flame retardant polymer composition.

18. A process for imparting flame retardance and low smoke emission to a composition comprising one or more thermoplastic vulcanizates, the process comprising the step of mixing the flame retardant composition of claim 15 and a thermoplastic elastomer.

* * * * *